United States Patent
Omran et al.

(10) Patent No.: US 12,530,780 B2
(45) Date of Patent: Jan. 20, 2026

(54) MOTION DISENTANGLEMENT FOR PREDICTING OBJECT MASKS AND MESHES

(71) Applicant: QUALCOMM Incorporated, San Diego, CA (US)

(72) Inventors: Mohamed Omran, Amsterdam (NL); Amir Ghodrati, Amsterdam (NL); Oleksandr Bailo, Amsterdam (NL); Jihong Ju, Amsterdam (NL); Amirhossein Habibian, Amsterdam (NL); Mohsen Ghafoorian, Diemen (NL)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 18/601,919

(22) Filed: Mar. 11, 2024

(65) Prior Publication Data

US 2025/0285288 A1    Sep. 11, 2025

(51) Int. Cl.
*G06T 7/149*    (2017.01)
*G06T 7/246*    (2017.01)
*G06T 7/73*    (2017.01)
*G06T 19/20*    (2011.01)

(52) U.S. Cl.
CPC .............. *G06T 7/149* (2017.01); *G06T 7/251* (2017.01); *G06T 7/75* (2017.01); *G06T 19/20* (2013.01); *G06T 2207/30196* (2013.01); *G06T 2207/30244* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2022/0076431 A1* | 3/2022 | Ansari | G06T 7/246 |
| 2022/0156581 A1* | 5/2022 | Li | G06N 3/084 |
| 2024/0013497 A1* | 1/2024 | Sun | G06T 7/55 |
| 2025/0086946 A1* | 3/2025 | Das | G06T 7/593 |

OTHER PUBLICATIONS

Ye, Vickie, et al. "Decoupling human and camera motion from videos in the wild." Proceedings of the IEEE/CVF conference on computer vision and pattern recognition. 2023. (Year: 2023).*

(Continued)

*Primary Examiner* — Zhengxi Liu
(74) *Attorney, Agent, or Firm* — Polsinelli LLP/QUALCOMM Incorporated

(57) ABSTRACT

Systems and techniques are provided for object segmentation. For instances, a process can include: obtaining camera pose information for frames of a set of input frames; predicting a future camera pose based on the camera pose information; generating 3-dimensional (3D) keypoints for an object present in the set of input frames; predicting a future location point of the object based on location points associated with the 3D keypoints for the object; predicting a future pose of the object based on the 3D keypoints; deforming a mesh model of the object based on the future pose of the object; and rendering a segmentation image based on the deformed mesh model, the future location point, and the future camera pose.

20 Claims, 11 Drawing Sheets

(56) References Cited

OTHER PUBLICATIONS

Mangalam, Karttikeya, et al. "Disentangling human dynamics for pedestrian locomotion forecasting with noisy supervision." Proceedings of the IEEE/CVF Winter Conference on Applications of Computer Vision. 2020. (Year: 2020).*
Lee, Dohae, Young Jin Oh, and In-Kwon Lee. "Future-frame prediction for fast-moving objects with motion blur." Sensors 20. 16 (2020): 4394. (Year: 2020).*
Yagi, Takuma, et al. "Future person localization in first-person videos." Proceedings of the IEEE Conference on Computer Vision and Pattern Recognition. 2018. (Year: 2018).*
Graber, Colin, et al. "Panoptic segmentation forecasting." Proceedings of the IEEE/CVF Conference on Computer Vision and Pattern Recognition. 2021. (Year: 2021).*
Xiao, Peng, et al. "Real-Time 3D Pedestrian Tracking with Monocular Camera." Wireless Communications and Mobile Computing 2022.1 (2022): 7437289. (Year: 2022).*
Priisalu, Maria. "Semantic and Articulated Pedestrian Sensing Onboard a Moving Vehicle." arXiv preprint arXiv:2309.06313 (2023). (Year: 2023).*
Saini, Nitin, et al. "SmartMocap: Joint estimation of human and camera motion using uncalibrated RGB cameras." IEEE Robotics and Automation Letters 8.6 (2023): 3206-3213. (Year: 2023).*
Chen, Kai, et al. "Future pedestrian location prediction in first-person videos for autonomous vehicles and social robots." Image and Vision Computing 134 (2023): 104671. (Year: 2023).*

* cited by examiner

MOTION DISENTANGLEMENT FOR PREDICTING OBJECT MASKS AND MESHES

FIELD

This application is related to image segmentation. For example, aspects of the application relate to systems and techniques for motion disentanglement for predicting object masks (e.g., segmentation masks for objects such as humans/people) and meshes.

BACKGROUND

Extended reality (XR) systems or devices can provide virtual content to a user and/or can combine real-world or physical environments and virtual environments (made up of virtual content) to provide users with XR experiences. XR systems typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR systems must be plugged into an external power source, and are thus not portable. Portable XR systems generally have short battery lives and/or are uncomfortably heavy due to inclusion of large batteries.

An XR system may include a head mounted display (HMD) that may be worn by a user of the XR system. Generally, it is desirable to keep an HMD display as lightweight and small as possible. To help reduce the weight and the size of an HMD display, the HMD display may be a relatively lower power system (e.g., in terms of battery and/or computational power) and the HMD display may be connected (e.g., wired or wireless connected) to another device (e.g., a mobile phone, a server device, or other device), referred to as a companion device. The companion device may be a relatively higher power system (e.g., in terms of battery and/or computational power) and may perform certain processing tasks for the HMD. For example, the companion device may perform processing tasks for generating information to be displayed on the HMD display. In some cases, such processing tasks may be split between the companion device and the HMD display. Split rendering as between the companion device and the HMD display may introduce challenges, such as latency between a time a frame is initially rendered by a companion device and when the frame is displayed by the HMD display. In some cases, it may be useful to reduce an effective latency (e.g., latency as perceived by a user) without necessarily improving an actual latency between when a frame is rendered and when the frame is displayed. Techniques to reduce an effective latency may be useful.

SUMMARY

Systems and techniques are described herein for displaying augmented reality enhanced media content. For example, aspects of the present disclosure relate to systems and techniques for reducing an effective latency by multi-sampling poses during reprojection. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for an apparatus for object segmentation is provided. The apparatus includes at least one memory and at least one processor coupled to the at least one memory. The at least one processor is configured to: obtain camera pose information for frames of a set of input frames; predict a future camera pose based on the camera pose information; generate 3-dimensional (3D) keypoints for an object present in the set of input frames; predict a future location point of the object based on location points associated with the 3D keypoints for the object; predict a future pose of the object based on the 3D keypoints; deform a mesh model of the object based on the future pose of the object; and render a segmentation image based on the deformed mesh model, the future location point, and the future camera pose.

As another example, a method for object segmentation is provided. The method includes: obtaining camera pose information for frames of a set of input frames; predicting a future camera pose based on the camera pose information; generating 3-dimensional (3D) keypoints for an object present in the set of input frames; predicting a future location point of the object based on location points associated with the 3D keypoints for the object; predicting a future pose of the object based on the 3D keypoints; deforming a mesh model of the object based on the future pose of the object; and rendering a segmentation image based on the deformed mesh model, the future location point, and the future camera pose.

In another example, a non-transitory computer-readable medium is provided. The non-transitory computer-readable medium includes stored thereon instructions that, when executed by at least one processor, cause the at least one processor to: obtain camera pose information for frames of a set of input frames; predict a future camera pose based on the camera pose information; generate 3-dimensional (3D) keypoints for an object present in the set of input frames; predict a future location point of the object based on location points associated with the 3D keypoints for the object; predict a future pose of the object based on the 3D keypoints; deform a mesh model of the object based on the future pose of the object; and render a segmentation image based on the deformed mesh model, the future location point, and the future camera pose.

As another example, an apparatus for object segmentation is provided. The apparatus includes: means for obtaining camera pose information for frames of a set of input frames; means for predicting a future camera pose based on the camera pose information; means for generating 3-dimensional (3D) keypoints for an object present in the set of input frames; means for predicting a future location point of the object based on location points associated with the 3D keypoints for the object; means for predicting a future pose of the object based on the 3D keypoints; means for deforming a mesh model of the object based on the future pose of the object; and means for rendering a segmentation image based on the deformed mesh model, the future location point, and the future camera pose.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the one or more apparatuses can include at least one camera for capturing one or more images or video frames. For example, the one or more apparatuses can include a camera (e.g., an RGB camera) or multiple cameras for capturing one or more images and/or one or more videos including video frames. In some aspects, the one or more apparatuses can include a display for displaying one or more images, videos, notifications, or other displayable data. In some aspects, the one or more apparatuses can include at least one transmitter configured to transmit data or information over a transmission medium to at least one device. In some aspects, at least one processor of the one or more apparatuses can include a central processing unit (CPU), a digital signal processor (DSP), a graphics processing unit (GPU), a neural processing unit (NPU), a neural signal process (NSP), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
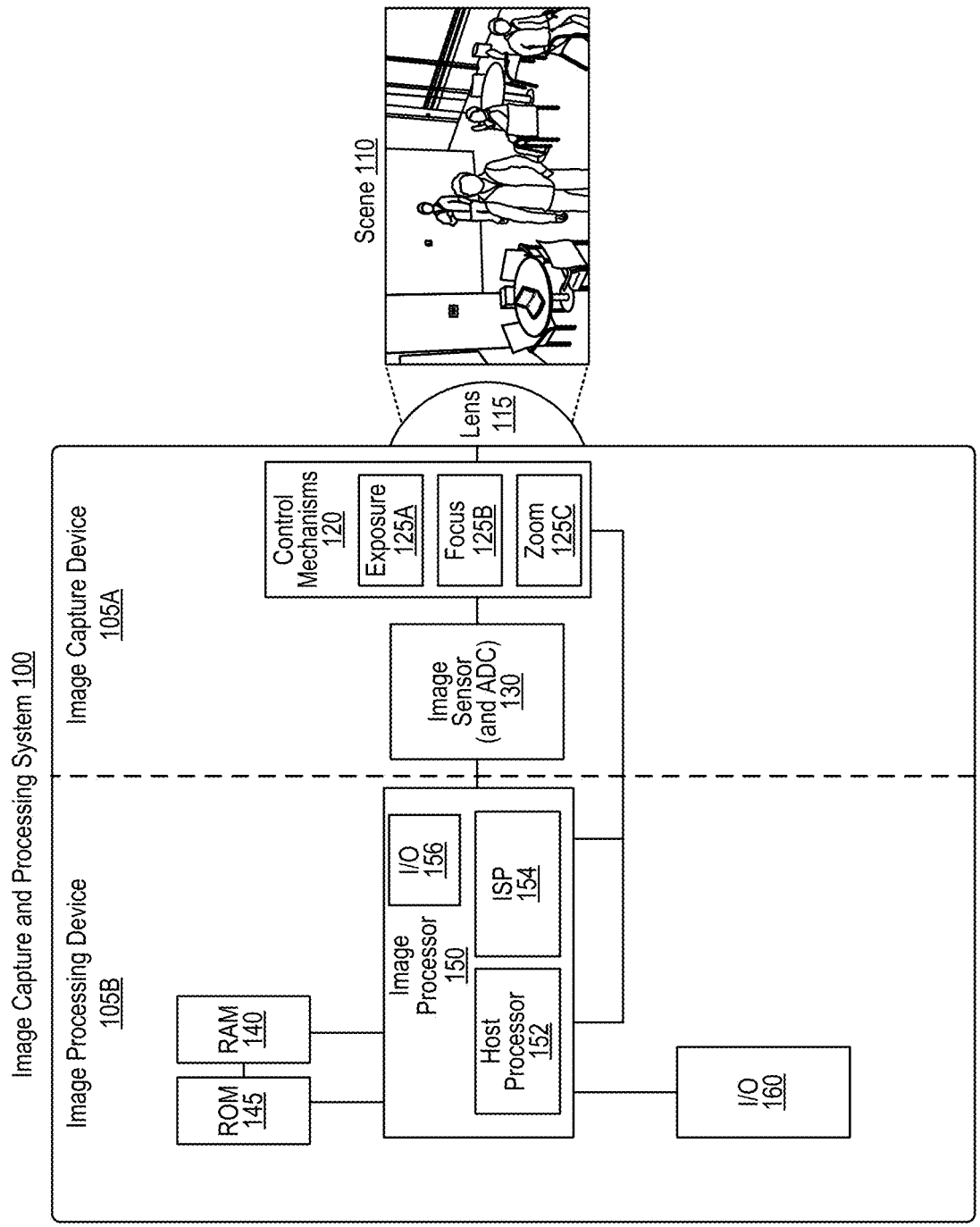
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems.

Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF-pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

In some cases, an XR system may include an HMD display, such as AR HMD or AR glasses, that may be worn by a user of the XR system. Generally, it is desirable to keep an HMD display as light and small as possible. To help reduce the weight and the size of an HMD display, the HMD display may be a relatively lower power system (e.g., in terms of battery and computational power) as compared to a device (e.g., a companion device, such as a mobile phone, a server device, or other device) with which the HMD display is connected (e.g., wired or wireless connected).

In some examples, an XR system may include a head mounted display (HMD) that can be worn by a user of the XR system. The HMD display may be a relatively lower power system (e.g., in terms of battery and/or computational power) to help reduce weight, size, and./or bulkiness of the HMD display. As the HMD display may be a relatively low power device, the HMD display may be connected (e.g., wired or wireless connected) to another device (e.g., a mobile phone, a server device, or other device), referred to as a companion device. The companion device may be a relatively higher power system (e.g., in terms of battery and/or computational power) and may perform certain processing tasks for the HMD. For example, the companion device may perform processing tasks for generating information to be displayed on the HMD display. In some cases, such processing tasks may be split between the companion device and the HMD display.

In some cases, split rendering may be implemented. In split rendering, the companion device may perform certain tasks with respect to one or more images to be displayed by the HMD display and may transmit results of the tasks to the HMD display. The HMD display may then perform additional image processing tasks and display the one or more images, such as reprojection. In some cases, there may be a delay inherent in remotely performing certain tasks at the companion device and transmitting the results to the HMD display for additional processing. In an XR system, it is possible for a user of the XR system to move the HMD display during such a delay. This movement can induce an overall shift in a field of view of the HMD display. Additionally, one or more objects in a field of view of the HMD display may move independently of the motion of the HMD display, such as a user's hand, arms, or other objects. Using a same transformation for different movements (e.g., hand movements, arm movements, etc.) can result in objects being displayed at incorrect positions on the display, which can result in an inconsistent immersive XR experience for the user of the HMD display.

In addition to split rendering, the HMD display may also (or instead) perform reprojection as a part of resampling image data. For example, the companion device may render images for display by the HMD at a certain frame rate, such as 60 frames per second (FPS). The HMD display may then reproject the images at a higher frame rate, such as 120 FPS. During reprojection, it is possible for a user of the XR system to move the HMD display (e.g., camera motion) during such a delay, causing an overall shift in a field of view of the HMD display. Additionally, other objects, such as people in the field of view of the HMD display, may move (e.g., object motion). Motion of a user or other objects during the rendering to display lag may cause virtual objects that may be rendered so that they appear in the real environment to appear out-of-place, overlapping a real object, improperly occluding/occluded, etc. Rendering to display lag may appear in any system which attempts to merge real-time effects, such as virtual objects, movement of a vehicle/robot, etc., and the real environment, such as XR systems, autonomous/semi-autonomous driving, robotics, and the like, and the techniques discussed herein may be applicable to any such systems.

Systems and techniques are described for performing motion disentanglement for prediction object masks and meshes. In some cases, predicting (e.g., motion prediction, motion forecasting) where an object may be and/or a pose of the object in the future (e.g., after a rending to display lag time) may be used to help compensate for the rendering to display lag. In some examples, the predication may be a predicted segmentation mask indicating where the object may be and/or what pose the object may take on. For example, a predicted segmentation mask may be generated based on a set of input images (e.g., frames). Based on the input frames, a camera pose may be determined and a future camera pose (e.g., based on the rendering to display lag time) may be predicted. Sets of 3D keypoints may also be generated based on the input frames. The 3D keypoints may be located at specific joints of the object and form a skeleton for the object. In some cases, the motion of an object may be disentangled into two components, an overall motion (e.g., point motion) of the object, and a pose motion. The overall motion may describe a movement of an entire person (which may be represented as a single location point) and the pose motion may describe movement of body parts of the person. Based on the 3D keypoints, a future location point of the object may be predicted based on location points of the 3D keypoints in the frames of the set of frames. A future pose of the object may also be predicted based on the 3D keypoints. A pre-existing mesh model of the object may be deformed based on the future pose of the object. This deformed mesh model may then be rendered using the future location point of the object and further camera pose to generate a segmentation image, such as a segmentation mask.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
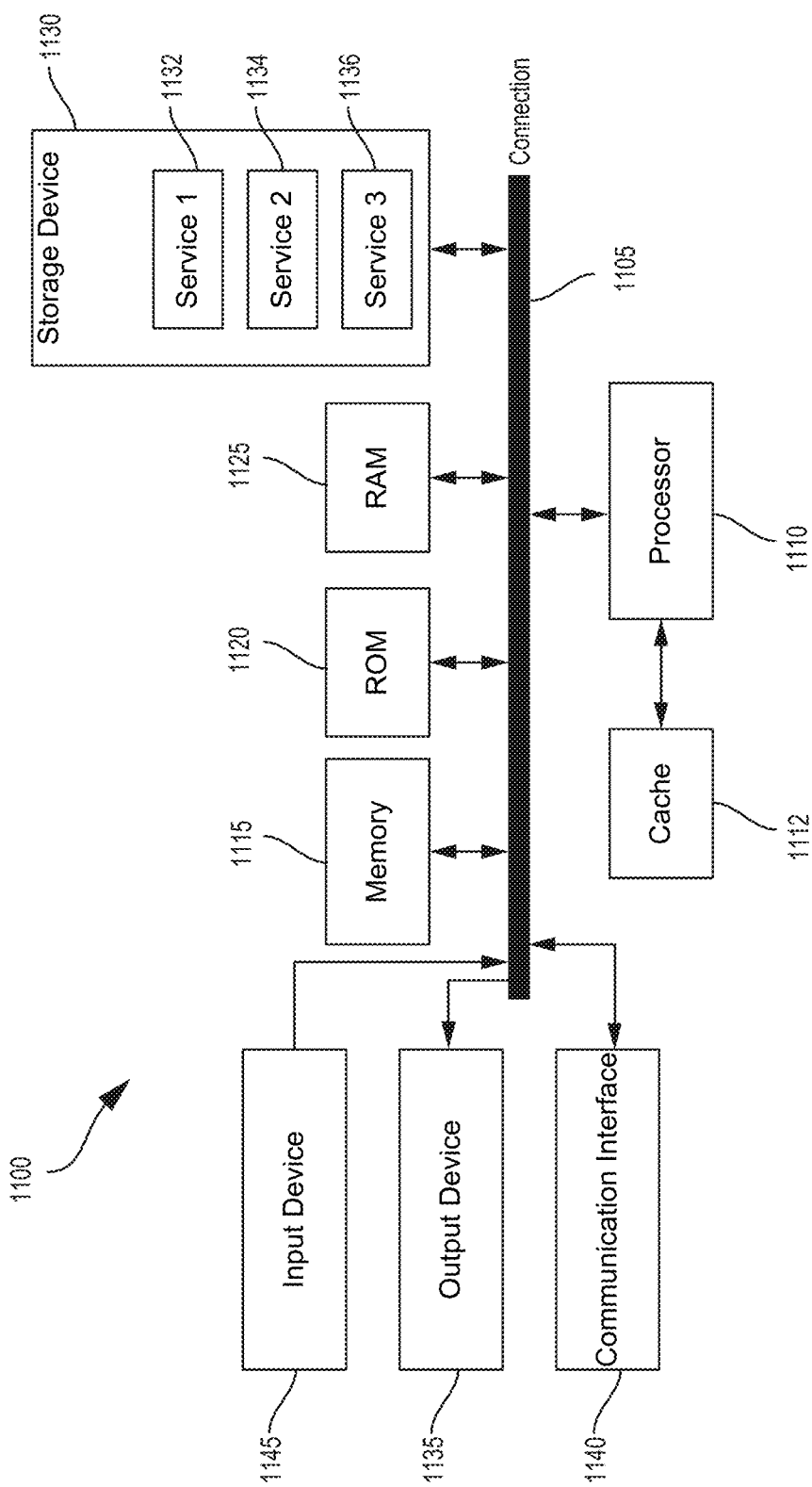
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
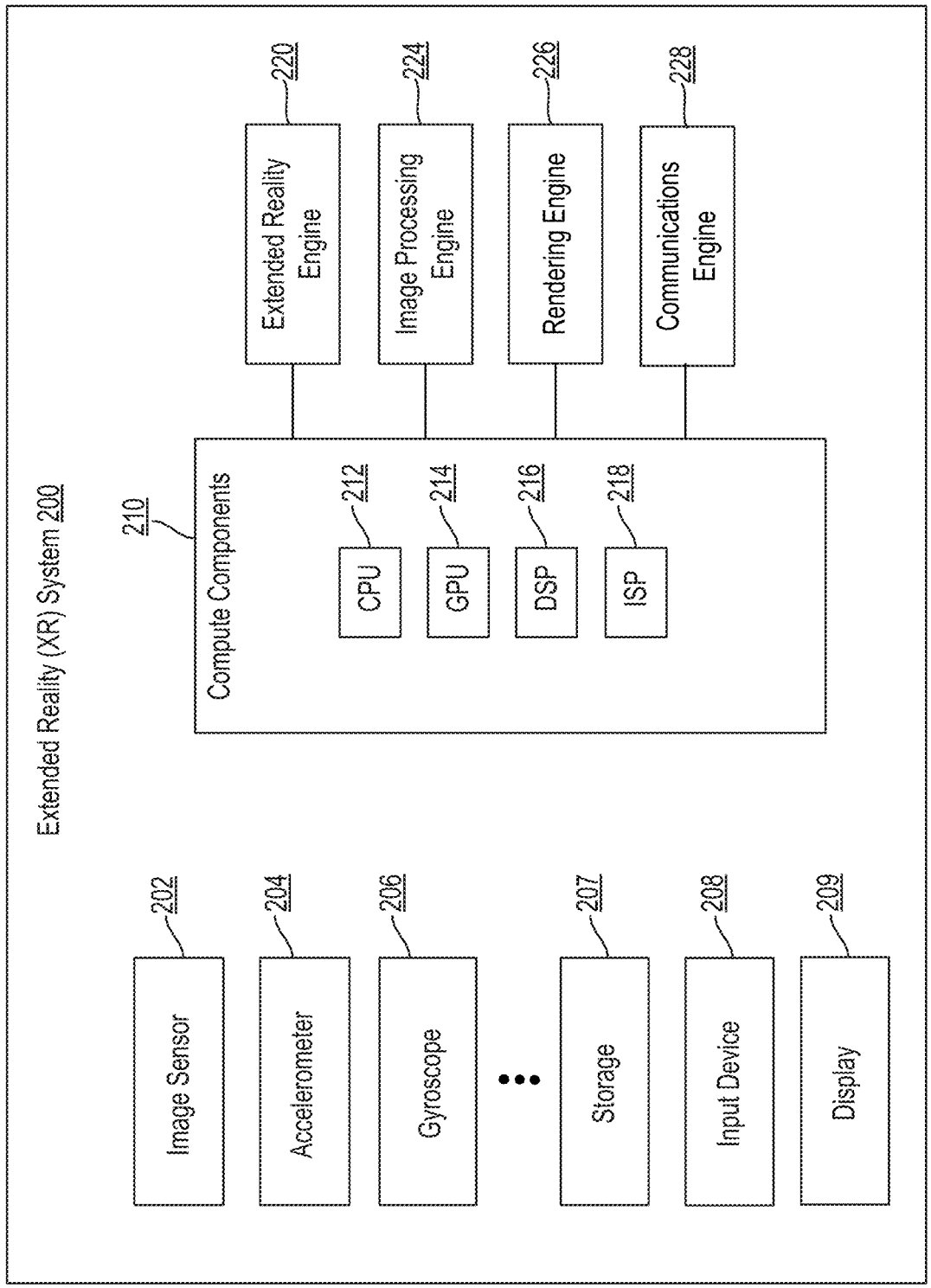
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1040 of FIG. 10.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device (e.g., mobile device 440 of FIG. 4, mobile device 540 of FIG. 5), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
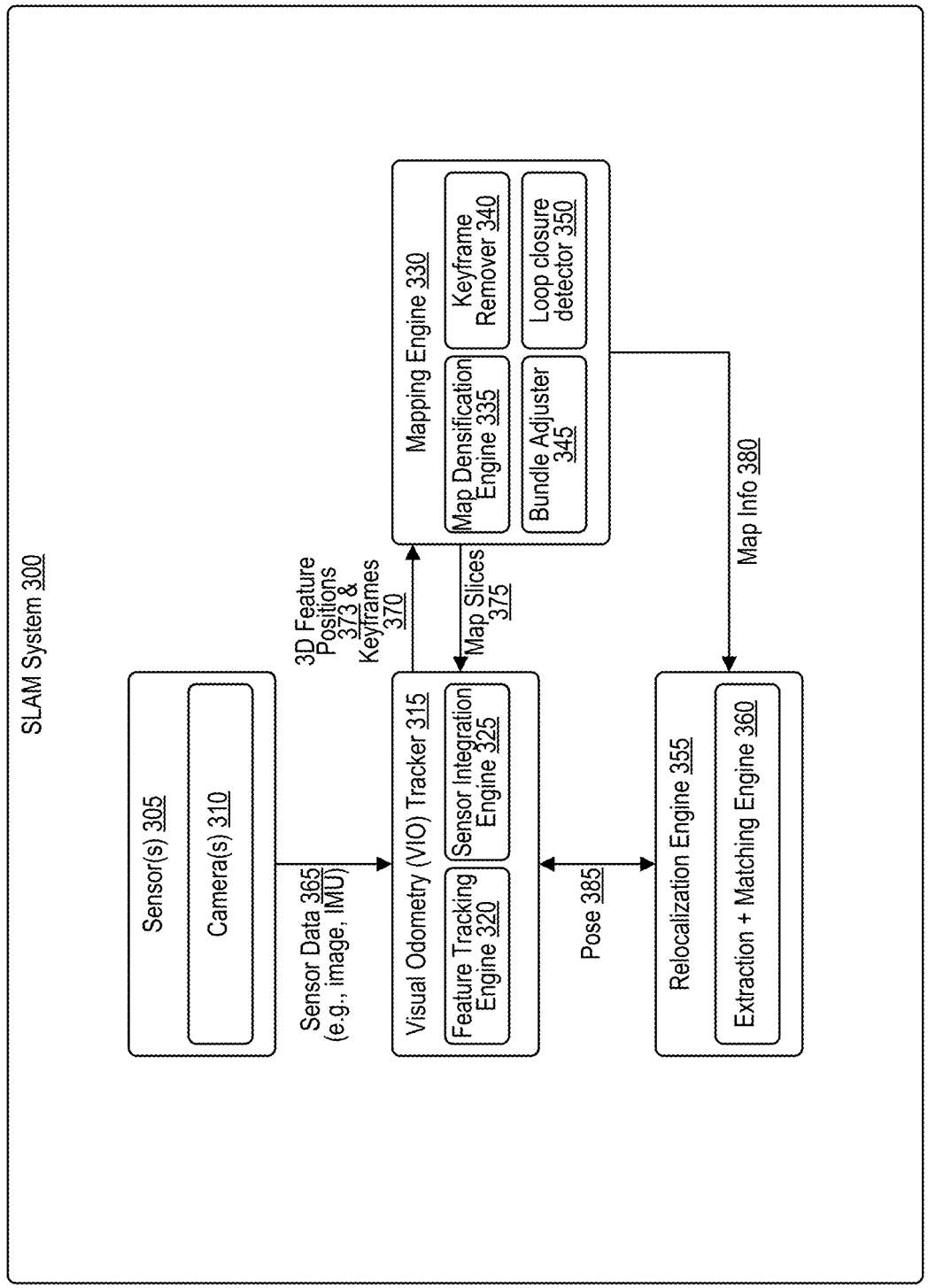
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, RADAR sensors, LIDAR sensors, SONAR sensors, SODAR sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4:
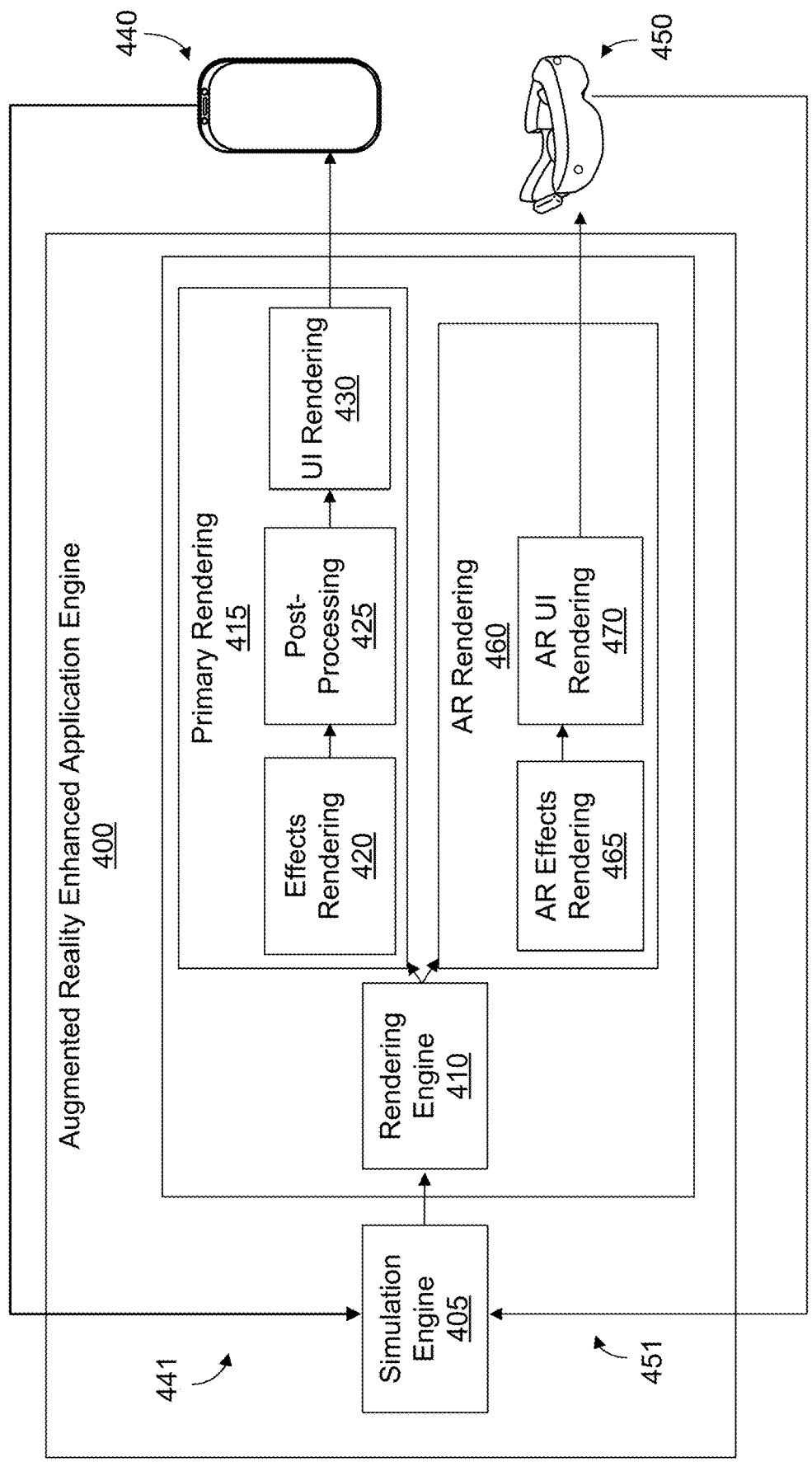
FIG. 4 illustrates an example of an augmented reality enhanced application engine, in accordance with aspects of the present disclosure.

FIG. 4 illustrates an example of an augmented reality enhanced application engine 400. In the illustrative example, the augmented reality enhanced application engine 400 includes a simulation engine 405, a rendering engine 410, a primary rendering module 415, and AR rendering module 460. As illustrated, the primary rendering module 415 can include an effects rendering engine 420, a post-processing engine 425, and a user interface (UI) rendering engine 430. The AR rendering module 460 can include an AR effects rendering engine 465 and an AR UI rendering engine 470. It should be noted that the components 405-470 shown in FIG. 4 are non-limiting examples provided for illustrative and explanation purposes, and other examples can include more, fewer, or different components than those shown in FIG. 4.

In some cases, the augmented reality enhanced application engine 400 is included in and/or is in communication with (wired or wirelessly) a mobile device 440. In some examples, the augmented reality enhanced application engine 400 is included in and/or is in communication with (wired or wirelessly) an XR system 450.

In the illustrated example of FIG. 4, the simulation engine 405 can generate a simulation for the augmented reality enhanced application engine 400. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 405 can be dynamic. For example, the simulation engine 405 can update the simulation based on different triggers, including, without limitation, physical contact, sounds, gestures, input signals, passage of time, and/or any combination thereof. As used herein, an application state of the augmented reality enhanced application engine 400 can include any information associated with the simulation engine 405, rendering engine 410, primary rendering module 415, effects rendering engine 420, post-processing engine 425, UI rendering engine 430, AR rendering module 460, AR effects rendering engine 465, AR UI rendering engine 470, inputs to the augmented reality enhanced application engine 400, outputs from the augmented reality enhanced application engine 400, and/or any combination thereof at a particular moment in time.

As illustrated, the simulation engine 405 can obtain mobile device input 441 from the mobile device 440. In some cases, the simulation engine 405 can obtain XR system input 451 from the XR system 450. The mobile device input 441 and/or XR system input 451 can include, for example, user input through a user interface of the application displayed on the display of the mobile device 440, user inputs from an input device (e.g., input device 208 of FIG. 2), one or more sensors (e.g., image sensor 202, accelerometer 204, gyroscope 206 of FIG. 2). In some cases, simulation engine 405 can update the application state for the augmented reality enhanced application engine 400 based on the mobile device input 441, XR system input 451, and/or any combination thereof.

In the illustrative example of FIG. 4, the rendering engine 410 can obtain application state information from the simulation engine 405. In some cases, the rendering engine 410 can determine portions of the application state information to be rendered by the displays available to the augmented reality enhanced application engine 400. For example, the rendering engine rendering engine 410 can determine whether a connection (wired or wireless) has been established between the XR system 450 and the mobile device 440. In some cases, the rendering engine 410 can determine the application state information to be rendered by the primary rendering module 415 and the AR rendering module 460. In some cases, the rendering engine 410 can determine that the XR system 450 is not connected (wired or wirelessly) to the mobile device 440. In some cases, the rendering engine 410 can determine the application state information for the primary rendering module 415 and forego determining application state information to be rendered by the AR rendering module 460 that will not be displayed. Accordingly, the rendering engine 410 can facilitate an adaptive rendering configuration for the augmented reality enhanced application engine 400 based on the availability and/or types of available displays. In some implementations, a separate rendering engine 410 as shown in FIG. 4 may be excluded. In one illustrative example, the primary rendering module 415 and/or AR rendering module 460 can include at least a portion of the functionality of the rendering engine 410 described above.

The primary rendering module 415 can include an effects rendering engine 420, post-processing engine 425, and UI rendering engine 430. In some cases, the primary rendering module 415 can render image frames configured for display on a display of the mobile device 440. As illustrated, the primary rendering module 415 can output the generated image frames (e.g., media content) to be displayed on a display of the mobile device 440. In some cases, the effects rendering information can render application state information generated by the simulation engine 405. For example, the effects rendering engine can generate a 2D projection of a portion of a 3D environment included in the application state information. For example, the rendering engine 420 may generate a perspective projection of the 3D environment by a virtual camera. In some cases, the application state information can include a pose of the virtual camera within the environment. In some cases, the effects rendering engine 420 can generate additional visual effects that are not included within the 3D environment. For example, the rendering engine 420 can apply texture maps to enhance the visual appearance of the effects generated by the 420. In some cases, the rendering engine 420 can exclude portions of the application state information designated for the AR rendering module 460 by the rendering engine 410. For example, the primary rendering module 415 may exclude effects present in the environment of the simulation.

In some cases, post-processing engine post-processing engine 425 can provide additional processing to the rendered effects generated by the effects rendering engine 420. For example, the post-processing engine 425 can perform scaling, image smoothing, z-buffering, contrast enhancement, gamma, color mapping, any other image processing, and/or any combination thereof.

In some implementations, UI rendering engine 430 can render a UI. In some cases, the user interface can provide application state information in addition to the effects rendered based on the application environment (e.g., a 3D environment). In some cases, the UI can be generated as an overlay over a portion of the image frame output by the post-processing engine 425.

The AR rendering module 460 can include an AR effects rendering engine 465 and an AR UI rendering engine 470. In some cases, the AR effects rendering engine 465 can render application state information generated by the simulation engine 405. For example, the AR effects rendering engine 465 can generate a 2D projection of a 3D environment included in the application state information. In some cases, the AR effects rendering engine 465 can generate effects that appear to protrude out from the display surface of the display of the mobile device 440.

In some cases, the display of the XR system 450 can have different display parameters (e.g., a different resolution, frame rate, aspect ratio, and/or any other display parameters) than the display of the mobile device 440. In some cases, the display parameters can also vary between different types of output devices (e.g., different HMD models, other XR systems, or the like). As a result, rendering display data for the 450 with the AR rendering module 460 can affect performance of the primary rendering module 415 (e.g., by consuming computational resources of a GPU, CPU, memory, or the like). In some cases, inclusion of the AR rendering module 460 within the augmented reality enhanced application engine 400 can require periodic updates to provide compatibility with different devices.

Figure 5:
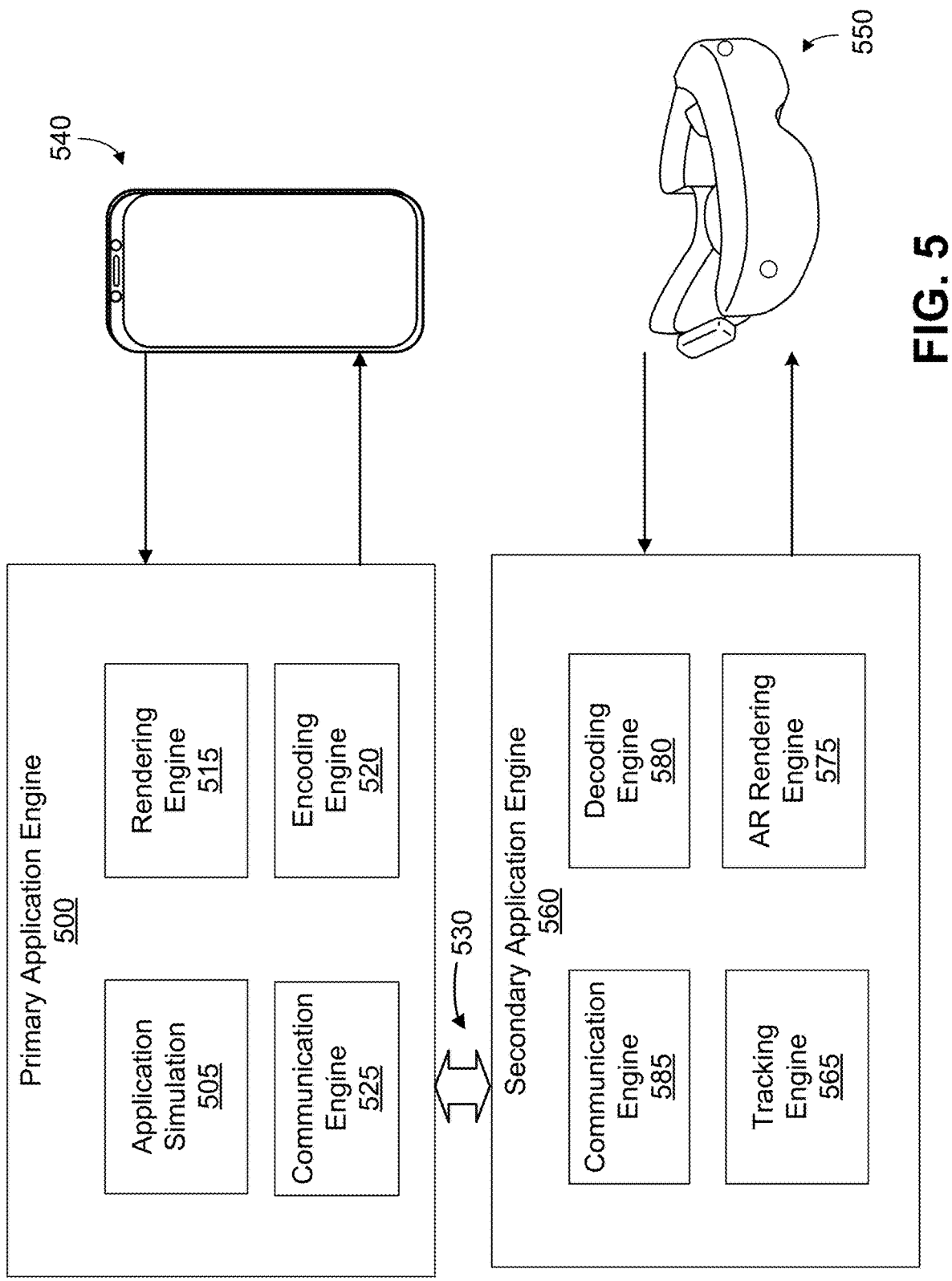
FIG. 5 illustrates an example of a primary application engine and a secondary application engine that can provide an augmented reality enhancement to the primary application engine, in accordance with aspects of the present disclosure.

FIG. 5 illustrates an example of a primary application engine 500 and a secondary application engine 560 that can provide an augmented reality enhancement to the primary application engine 500. In the illustrative example of FIG. 5, the primary application engine 500 includes a simulation engine 505, a rendering engine 515, an encoding engine 520, and a communication engine 525. In the illustrated example, the secondary application engine 560 includes a tracking engine 565 (e.g., XR engine 220 of FIG. 2, VIO tracker 315 of FIG. 3), an AR rendering engine 575, a decoding engine 580, and a communication engine 585. As illustrated the primary application engine 500 and secondary application engine 560 can communicate over a (wired or wireless) communications link 530. It should be noted that the components 505-525 shown in the primary application engine 500 of FIG. 5 are non-limiting examples provided for illustrative and explanation purposes, and other examples can include more, fewer, or different components than those shown in FIG. 5. Similarly, it should be noted that the components 565-585 shown in the secondary application engine 560 of FIG. 5 are non-limiting examples provided for illustrative and explanation purposes, and other examples can include more, fewer, or different components than those shown in FIG. 5.

In the illustrated example of FIG. 5, the simulation engine 505 of primary application engine 500 can generate a simulation for an application on a mobile device 540. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 505 can be dynamic. For example, the simulation engine 505 can update the simulation based on different triggers, including, without limitation, physical contact, sounds, gestures, input signals, passage of time, and/or any combination thereof. As used herein, an application state of the primary application engine 500 can include any information associated with the simulation engine 505, effects rendering engine 515, communication engine 525, and/or any combination thereof at a particular moment in time.

The rendering engine 515 can correspond to the primary rendering module 415 of FIG. 4 and perform similar functions. For example, the rendering engine 515 can include modules for effects rendering (e.g., rendering engine 420 of FIG. 4), post-processing (e.g., post-processing engine 425 of FIG. 4), and/or UI rendering (e.g., UI rendering engine 430 of FIG. 4).

The communication engine 525 of the primary application engine 500 and the communication engine 585 of the secondary application engine 560 can communicate over a communications link 530. In some cases, the communications link 530 can be bidirectional. In some examples, the communication engine 525 can transmit application state information (e.g., from the simulation engine 505) to the communication engine 585 of the 560. In some cases, the application state information can include information that can be used to generate AR effects. In some examples, the application state information can include data that can be used by the secondary application engine 560 to generate an AR UI. In some cases, the communication engine 525 can also transmit inputs obtained from the mobile device 540 over the communications link 530 to the communication engine 585. In some cases, the communication engine 585 of the secondary application engine 560 can transmit pose information, connectivity status, user inputs, or the like to the communication engine 525 of the primary application engine 500. The communication engine 525 and communication engine 585 can also transmit and/or receive synchronization signals for synchronizing display between a display of the mobile device 540 and a display of an HMD 550. The examples of communications between the communication engine 525 and communication engine 585 provided herein are non-limiting and provided as examples. In some cases, more, fewer, and/or different information can be communicated over the communications link 530 without departing from the scope of the present disclosure. While an HMD 550 is used as an illustrative example of an XR device herein, the systems and techniques can be used for any type of XR device, such as AR, VR, or MR glasses.

Referring to the secondary application engine 560, the tracking engine 565 can perform tracking (e.g., SLAM, VIO, etc.) using information captured by sensors (e.g., image sensor 202, accelerometer 204, gyroscope 206 of FIG. 2, one or more sensors 305, cameras 310 of FIG. 3, or the like). In some cases, tracking engine 565 can determine a pose of the mobile device 540, a pose of the HMD 550, an environment map, or the like. In some aspects, the tracking engine 565 can determine a contour of a display of the mobile device 540. In some cases, the contour of the display of the mobile device 540 can include a boundary. In some cases, the pose of the mobile device 540 and/or the contour, and/or boundary of the display of the mobile device 540 can be output to the AR rendering engine 575 to provide a target for displaying the AR information (e.g., AR effects, AR UI) on a display of the HMD 550.

The AR rendering module 460 can be similar to and perform similar functions to the AR rendering module 460 of FIG. 4. For example, in some implementations, the HMD 550 can include an AR effects rendering engine (e.g., AR effects rendering engine 465 of FIG. 4) and/or an AR UI rendering engine (e.g., AR UI rendering engine 470 of FIG. 4). In some cases, the AR rendering engine 575 can output AR media content to the HMD 550 with different display parameters (e.g., a different resolution, frame rate, aspect ratio, and/or any other display parameters) than the media content output from the rendering engine 515 to the mobile device 540. In some cases, by dividing the rendering functionality between a primary application engine 500 and a secondary application engine 560, the computational resources for providing an AR enhanced application experience can be shared between computational resources of multiple devices such as the mobile device 540 and HMD 550. In addition, providing a separate AR rendering engine 575 in the secondary application engine 560 can simplify development of the primary application engine 500. For example, the rendering engine 515 of the primary application engine 500 may not require maintaining compatibility with a variety of different mobile devices with different display configurations.

In some cases, the HMD 550 may be relatively constrained in terms of battery and processing power, as compared to mobile device 540, to allow the HMD 550 to be wearable. To reduce processing requirements for the HMD 550, frames for display by the HMD 550 may be rendered by the mobile device 540 and transmitted to the HMD 550 via communications link 530. In some cases, the HMD may receive multiple frames for display to the user concurrently. For example, the rendering engine 515 of the mobile device 540 may render a left eye frame, a right eye frame, and, in some cases, provide depth information. For instance, the depth information can include information indicating distances of points in a scene (e.g., points corresponding to a surface of an object) from a point of view, such as a camera viewpoint. In some cases, the depth information may be inferred based on differences between the left eye frame and the right eye frame received, for example, by the HMD 550. In some cases, the depth information may be used to warp (e.g., apply a displacement vector to) portions of the frames to help adjust for movement of objects that may move independently of the camera (such as cameras on the HMD 550), between the time the frames are rendered by the rendering engine 515 and when the frames are received by the HMD 550. The rendered frame may be in any known frame or video format. In some cases, the frames may only include objects to be overlaid on an environment visible through the HMD 550. An encoding engine 520 may encode the rendered frames to reduce a size of the frames for transmission. The encoded frames may be transmitted, via communication engine 525 and communications link 530, to the HMD 550.

The HMD may receive the encoded frames via communication engine 585. For example, these received frames may then be decoded by decoding engine 580. In some cases, there may be a delay (e.g., display latency) introduced by the rendering, encoding, transmitting, receiving, and decoding process, and during this display latency, a user may, for example, move the HMD 550. This movement may not be accounted for by the frames as rendered by the rendering engine 515 and any objects in the rendered frames may be displayed in a different location than expected due to the movement. To account for the potential motion of the HMD 550, the AR rendering engine 575 may warp the received frames based on pose and/or tracking information from the tracking engine 565 describing the movement of the HMD 550. In some cases, the techniques discussed herein may be applicable to other scenarios where there is sufficient lag between when frames are rendered and when those frames are displayed that noticeable movement may have occurred.

As indicated above, a feature tracking engine 320, may perform feature tracking by recognizing features that were previously recognized in one or more previous images. In some cases, as a part of feature tracking, the feature tracking engine 320 may also estimate and/or track a pose of objects and features in the environment. For example, pose estimation may predict (e.g., estimate) a position of another object. In some cases, this estimation may be relative to the system and/or a user of the system. In some examples, pose estimation may be performed for an articulated object based on a set of keypoints for the object. In some cases, the set of keypoints may form a skeleton for the articulated object. The estimated pose of objects may also be used for a variety of operations, such as gesture detection, collision detection, user interfacing, and the like.

Figure 6:
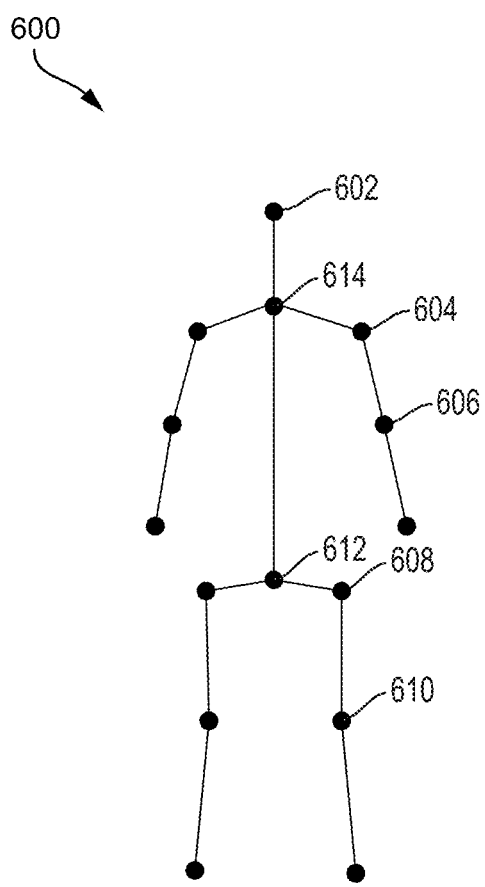
FIG. 6 illustrates a set of keypoints for a person, in accordance with aspects of the present disclosure.

FIG. 6 illustrates a set of keypoints 600 for a person, in accordance with aspects of the present disclosure. Keypoints may be points of interest of an object. For articulated objects, that is, objects which include joints which allow parts of the object to move, some keypoints may correspond to joints as well as other points of interest and/or features. Examples of articulated objects may include animals with a skeleton, devices which include a hinge or other joint, and the like. The set of such keypoints may form a skeleton for the object that may be used to estimate a pose of the object, animate the object, etc.

As a more specific example, a pose of a person may be estimated using a set of keypoints corresponding to major joints/features of a person, such a center of a head/face 602, shoulders 604, elbows 606, hips 608, knees 610, abdomen 612, base of the neck 614, etc. Thus, pose estimation may be performed using a certain set of predetermined keypoints for an object, such as a person. In some cases, keypoints may be detected based on information about the object. Examples of information about the object may include one or more images of the object or other types of data regarding of the object, such as from a lidar or radar scan. In some cases, one or more machine learning models may be used to detect keypoints of objects from the information about the object.

As indicated above, there can be a delay, or rendering to display lag/delay, between when an image is rendered and when the rendered image is displayed. For example, as a part of split rendering, a frame may be rendered by a rendering engine, such as a GPU, of a companion device and the frame may be passed to a display device, such as an HMD display. In some cases, there may be a delay inherent in remotely performing certain tasks at the companion device and transmitting the results to the HMD display for additional processing. It is possible for a user of the XR system to move the HMD display (e.g., camera motion) during such a delay, causing an overall shift in a field of view of the HMD display. Additionally, other objects, such as people in the field of view of the HMD display, may move (e.g., object motion). Motion of a user or other objects during the rendering to display lag may cause virtual objects that may be rendered so that they appear in the real environment to appear out-of-place, overlapping a real object, improperly occluding/occluded, etc. Rendering to display lag may appear in any system which attempts to merge real-time effects, such as virtual objects, movement of a vehicle/robot, etc., and the real environment, such as XR systems, autonomous/semi-autonomous driving, robotics, and the like.

In some cases, predicting (e.g., motion prediction, motion forecasting) where an object may be and/or a pose of the object in the future (e.g., after a rending to display lag time) may be used to help compensate for the rendering to display lag. In some examples, the predication may be a predicted segmentation mask indicating where the object may be and/or what pose the object may take on. A segmentation mask may be a binary image of an object or object, such as people, which labels pixels of the object with a value and pixels not of the object with another value. Of note, while discussed in the context of a segmentation mask, any representation of the real environment which labels object types, such as a segmented image, segmented lidar/radar points, etc. may be used. While motion prediction may be performed based on a current motion of an object, it may be useful to take into account how an object can move. For example, a person may move around a set of major joints and this set of major joints may be represented by a set of keypoints. The set of keypoints can be a sparse representation of a person that may also encode a pose of the person and the absolution location (e.g., relative to the real environment, rather than, for example, relative to an image) of the person. As the motion of the person may be defined based on the set of keypoints, the set of keypoints may allow for a more structured motion prediction. For example, the relationship between the keypoints may constrain the prediction as the keypoints for an object should move in specific ways rather than randomly with respect to each other (e.g., a distance between keypoints for a hip and leg may not get larger, a keypoint for the hip cannot become linked to the keypoint of the elbows, etc.). Additionally, as the set of keypoints can encode the absolute location of a person, camera motion may be factored out and separately handled.

Additionally, different sources of motion, such as object motion and camera motion, may be separately handled to help improve accuracy of motion prediction for an object.

Figure 7:
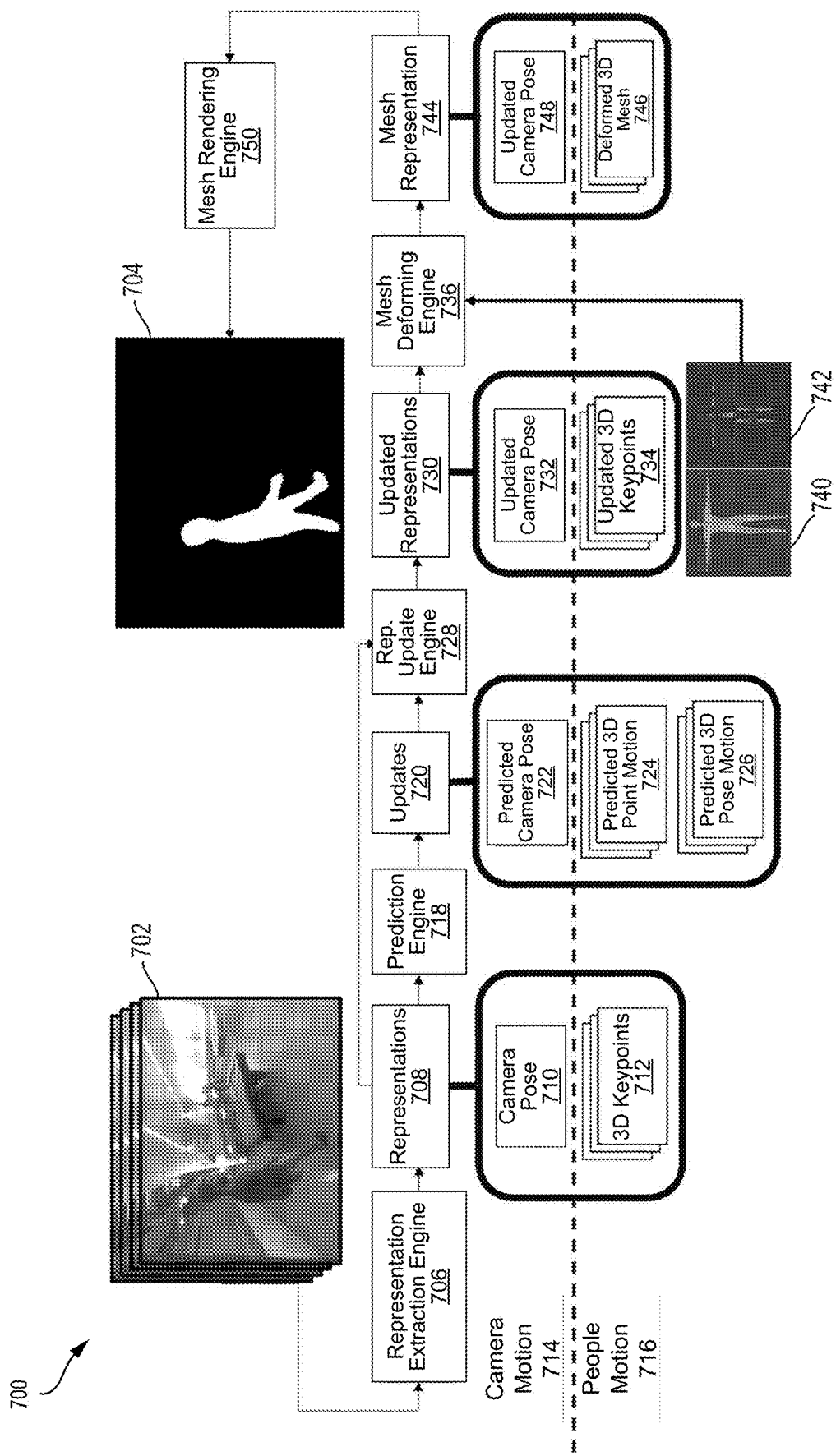
FIG. 7 is a block diagram illustrating a technique for motion disentanglement for predicting human masks and meshes, in accordance with aspects of the present disclosure.

FIG. 7 is a block diagram illustrating a technique 700 for motion disentanglement for predicting human masks and meshes, in accordance with aspects of the present disclosure. The technique 700 may take, as input, a sequence of input frames 702 and output a predicted segmentation image of the object (e.g., person) at a future point in time, such as +150 milliseconds (ms) from the last input frame 702. In some cases, the predicted segmentation image may be a segmentation mask 704 for an object. In other cases, the predicated segmentation image may be a semantically segmented image. The sequence of input frames may include two or more images of a real environment. Of note, while discussed with respect to persons, it should be understood that the object may be any articulated object.

The sequence of input frames 702 may be input to one or more representation extraction engines 706 to generate representations 708 of the sequence of input frames 702. The representations 708 may include camera pose information 710 and 3D keypoints 712 for objects (e.g., people) in the sequence of input frames 702. The camera pose information 710 may represent the camera pose for frames of the sequence of input frames 702 at the time a frame was captured and the 3D keypoints 712 may represent objects (e.g., people) in the frame at the time the frame was captured. In some cases, the camera pose information 710 may be used to predict a camera motion 714 and the 3D keypoints 712 may be used to predict people motion 716 (e.g., motion of people in the frames). In some cases, the camera pose information 710 may include a pose of the camera relative to the real environment. In some cases, the camera pose information 710 may be obtained, for example, based on SLAM techniques described above.

The 3D keypoints 712 may be similar to the set of keypoints 600 of FIG. 6 and form a skeleton for a person in the image. In some cases, the 3D keypoints 712 may be detected in the frames of the sequence of input frames 702, for example, using one or more ML models trained to predict 3D keypoints. As a more specific example, object detection for persons frames of the sequence of input frames 702 may be performed to detect and place a bounding box around people in the images. In some cases, object detection may be performed by an ML based object detector, such as you-only-look-once (YOLO), detection transformer (DETR), etc. Once detected in one or more frames, an object may be tracked across the frames using a object tracker. In some cases, object tracking (e.g., person tracking) may be used to track a particular object across multiple frames. Tracking a specific object across frames may be useful for acquiring a motion history for the object. Object tracking may use bounding box information from object detection to track a particular object for multiple frames. In some cases, object tracking may be performed by an algorithmic object tracker, such as a simple online and real-time tracking (SORT).

A bounding box for a person (e.g., from the object detector) and the camera pose (e.g., camera pose information 710) may be passed to a 3D keypoints detector to extract the set of keypoints. In some cases, the 3D keypoint detector may also be ML based, such as metric scale truncation robust heatmaps for absolute 3D human pose estimation (MeTRabs), PoseFormer, etc. the 3D keypoint detector may, for a bounding box, predict a set of 3D keypoints using camera pose. The 3D keypoints may be located with respect to the real environment (e.g., an absolute location of 3D keypoints in the scene). In some cases, the 3D keypoint detector may also fit the 3D keypoints to a set of 2D counterparts (e.g., estimated locations of the set of keypoints in 2D space) to improve absolute location estimates.

The representations 708 may be passed to a prediction engine 718 to predict updates 720 for the representations 708. The updates 720 may be predictions for expected camera motion 714 and people motion 716 after the display lag (e.g., for when the frame is to be displayed). The updates 720 may include a predicted camera pose 722. In some cases, the predicted camera pose 722 may be an extrapolation based on the camera pose information 710. For example, the predicted camera pose 722 may be extrapolated from the camera pose for the frames of the sequence of input frames 702. In some cases, one or more ML models may be used to predict the predicated camera pose 722. In other cases, predicting the predicated camera pose 722 may be performed using algorithmic techniques, such as a Kalman filter.

In some cases, people motion (e.g., object motion) may be disentangled into two components, an overall motion (e.g., point motion) and a pose motion (e.g., deformation). The overall motion may describe a movement of an entire person and the pose motion may describe movement of body parts of the person. For example, for a person doing jumping jacks, the overall motion may describe the vertical motion of the person and the pose motion may describe the flapping motion of the person's arms and legs. The updates 720 may also include a predicted 3D point motion 724 and a predicted 3D pose motion 726.

As indicated above, a set of keypoints, such as 3D keypoints 712 may encode an absolute location of a person in the real environment. In some cases, the absolute location may be expressed as a location of a point (e.g., location point) and the location point may be derived based on one or more key points of the set of keypoints. For example, referring back to FIG. 6, the location point of the set of keypoints 600 may be based on a specific keypoint, such as keypoint representing the base of the neck 614, an average of a subset of keypoints, such as an average the keypoints representing the shoulders 604 and hips 608, a middle of a pair of keypoints, such as the base of the neck 614 and abdomen 612, and the like. In some cases, the predicted 3D point motion 724 may be extrapolated based on the location points of the 3D keypoints 712 for the frames of the sequence of input frames 702. The location points of the 3D keypoints 712 across frames may be associated with a particular object based on information from the object tracker. In some cases, the extrapolation of the location point may be performed by one or more ML models. In other cases, the extrapolation may be performed using algorithmic techniques, such as a Kalman filter, moving average filter, etc., to produce a predicted future location point of the object as the predicted 3D point motion 724 of the object.

In some cases, the predicted 3D pose motion 726 may be predicted independently of changes to the absolute location of the person. Predicting the predicted 3D pose motion 726 independently of changes to absolute location may allow for greater prediction accuracy as changes to the absolute location of the person may distort pose changes. For example, as discussed above, the 3D keypoints 712 for the frames of the sequence of input frames 702 are located relative to the environment and thus may reflect both overall motion and pose motion. In some cases, the 3D keypoints 712 for the frames of the sequence of input frames 702 may be aligned based on the location point of the 3D keypoints 712 for the frames. Aligning the 3D keypoints 712 for the frames of the sequence of input frames 702 allows the overall motion of the person to be removed (e.g., subtracted out) from the individual keypoints of the 3D keypoints 712 for the frames of the sequence of input frames 702, isolating the pose motion. These pose motion 3D keypoints may be passed into a pose predictor. In some cases, the pose predictor may be ML based, such as a recurrent neural network, transformers, simple baseline for human motion prediction (siMLPe), etc. The pose predictor may generate the predicted 3D pose motion 726 of an object in the future as a set of predicted 3D keypoints.

In some cases, the predicted 3D pose motion 726, the predicted 3D pose motion 726, and the representations 708 may be input to a representation update engine 728 to generate the updated representations 730. For example, the predicted location of the location point of the predicted 3D point motion 724 may be applied to the set of predicted 3D keypoints of the predicted 3D pose motion 726 to integrate the overall motion and pose motion (e.g., entangle the two components of people motion) to predict a future object (e.g., person, human) motion. This predicted future people motion may be applied to the 3D keypoints 712 to generate the updated 3D keypoints 734.

For the updated representations, the camera pose information 710 may be updated based on the predicted camera pose 722 as the updated camera pose 732. For example, the predicted camera pose 722 may be used as the updated camera pose 732.

The updated 3D keypoints 734 and updated camera pose 732 of the updated representations 730 may be passed to a mesh deforming engine 736. The mesh deforming engine 736 may generate a mesh representation 744 of the object from the updated 3D keypoints 734. The mesh representation 744 may include a deformed 3D mesh 746 of the object and an updated camera pose 748. In some cases, the updated camera pose 748 may be substantially similar to the updated camera pose 732. In some cases, deformed the 3D mesh 746 may be generated from a template 3D mesh 740 using a skinning process which wraps an underlying representation, such as the 3D keypoints, skeleton, etc., with a surface representation, such as the 3D mesh 746. Examples of this skinning process include simple skinning, linear blend skinning, dual quaternion skinning, and so forth. The mesh deforming engine 736 may receive a template 3D mesh 740 and a reference skeleton 742. In some cases, portions of the template 3D mesh 740 may be registered to portions of the reference skeleton 742. For example, a part of the template 3D mesh 740 corresponding a person's forearm may be registered to a part of the reference skeleton 742 which corresponds to a person's ulna/radius bones (e.g., of the forearm). Portions of the reference skeleton 742 may also be registered to certain 3D keypoints (e.g., from the keypoint corresponding to the elbow to another keypoint corresponding to the hand) to map reference skeleton 742 to the keypoints of the updated 3D keypoints 734. The reference skeleton 742 and template 3D mesh 740 may be deformed based on the updated 3D keypoints 734 (e.g., predicted future pose of the object). For example, the parts reference skeleton 742 may be moved about joints of the reference skeleton 742 based on the updated 3D keypoints 734, and the 3D mesh may be deformed, for example, about the joints using linear blend skinning to conform with the moved reference skeleton 742. In linear blend skinning, the vertices of the mesh (e.g., template 3D mesh 740) may be transformed by multiple transforms based on weights from influencing portions of the skeleton (e.g., joints/bones of the reference skeleton 742) to allow the template 3D mesh 740 to follow the moved parts of the reference skeleton 742 (e.g., bones) about the joints of the reference skeleton 742 to form the deformed 3D mesh 746. The deformed 3D mesh 746 and updated camera pose 748 of the mesh representation 744 may be output to a mesh rendering engine 750. The mesh rendering engine 750 may render the deformed 3D mesh 746 based on the updated camera pose 748. For example, the mesh rendering engine 750 may render the deformed 3D mesh from the point of view of a camera having a pose of the updated camera pose 748 using any rendering technique to generate the segmentation mask 704 of the object.

Figure 8:
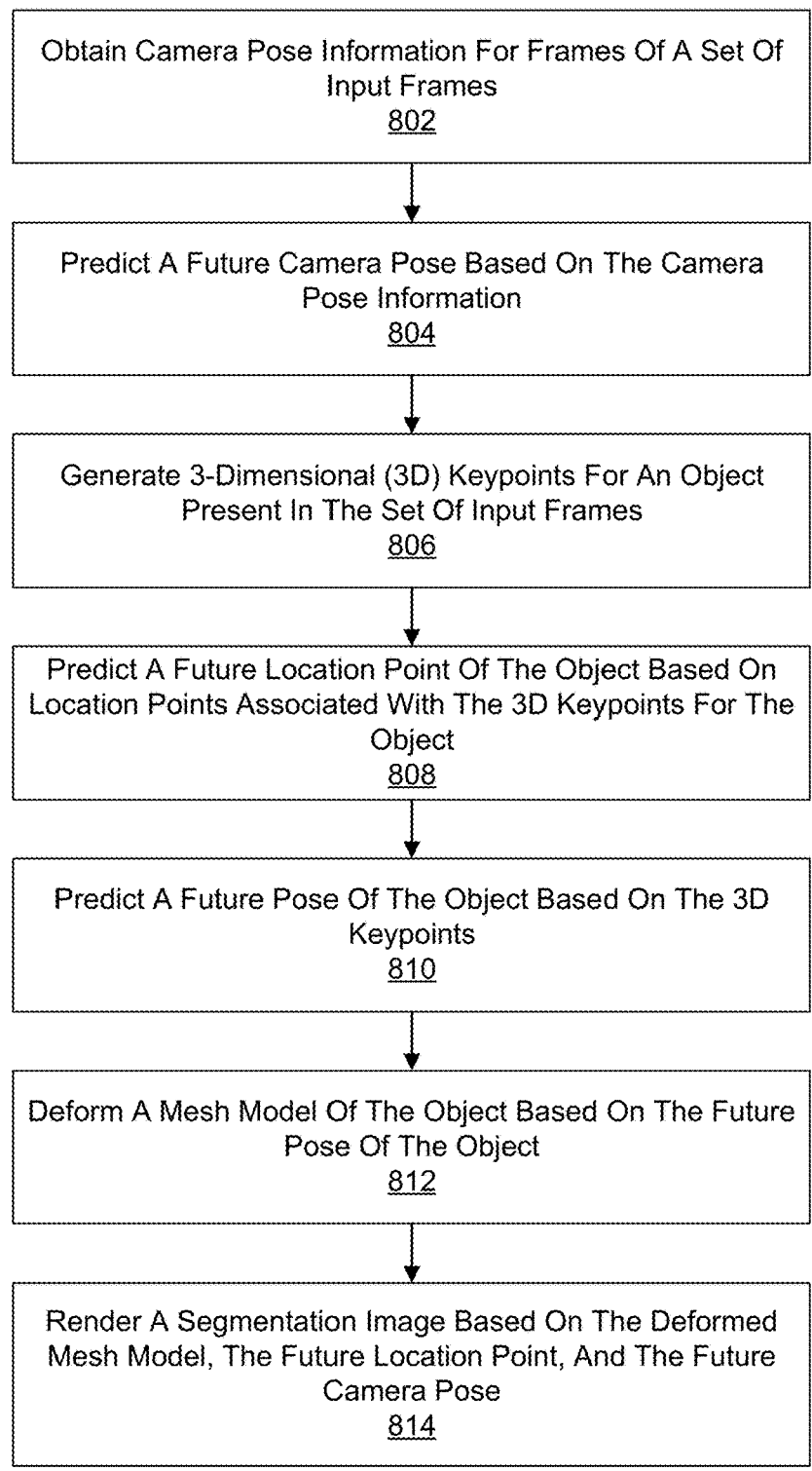
FIG. 8 is a flow diagram illustrating a process for object segmentation, in accordance with aspects of the present disclosure.

FIG. 8 is a flow diagram illustrating a process 800 for object segmentation, in accordance with aspects of the present disclosure. The process 800 may be performed by a computing device (or apparatus) or a component (e.g., a chipset, codec, etc.) of the computing device (e.g., image capture and processing system 100, of FIG. 1, XR system 200 of FIG. 2, XR system 450 of FIG. 4, HMD 550 of FIG. 5, computing system 1100 of FIG. 11, etc.). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors (e.g., image processor 150, host processor 152 of FIG. 1, compute components 210 of FIG. 2, processor 1110 of FIG. 11, etc.).

At block 802, the computing device (or component thereof) may obtain camera pose information (e.g., camera pose information 710 of FIG. 7) for frames of a set of input frames (e.g., input frames 702 of FIG. 7). In some cases, the camera pose information may be obtained, for example, based on SLAM techniques.

At block 804, the computing device (or component thereof) may predict a future camera pose (e.g., predicted camera pose 722) based on the camera pose information. For example, the predicted camera pose may be extrapolated from the camera pose for the frames of the sequence of input frames.

At block 806, the computing device (or component thereof) may generate 3-dimensional (3D) keypoints (e.g., 3D keypoints 712 of FIG. 7) for an object (e.g., person) present in the set of input frames. In some cases, the computing device (or component thereof) may determine location points for the 3D keypoints. The location points may describe a motion of an object independent of camera motion. In some examples, the location points are based on an average location of a subset of 3D keypoints for the object, and wherein the location points describe an overall motion of the object in the set of input frames.

At block 808, the computing device (or component thereof) may predict a future location point (e.g., predicted 3D point motion 724 of FIG. 7) of the object based on location points associated with the 3D keypoints for the object. In some cases, the future location point of the object is determined from the location points.

At block 810, the computing device (or component thereof) may predict a future pose (e.g., predicted 3D pose motion 726 of FIG. 7) of the object based on the 3D keypoints. In some cases, the future pose of the object is predicted independent of an overall motion of the object. For example, people motion (e.g., object motion) may be disentangled into two components, an overall motion (e.g., point motion) and a pose motion (e.g., deformation). In some example, the computing device (or component thereof) may to predict the future pose of the object by: aligning 3D keypoints of the frames based on a determined location point of the 3D keypoints used for determining an overall motion of the object; removing the overall motion of the object from the 3D keypoints of the frames to generate pose motion 3D keypoints; and predicting the future pose based on the pose motion 3D keypoints.

At block 812, the computing device (or component thereof) may deform a mesh model (e.g., deformed 3D mesh 746 of FIG. 7) of the object based on the future pose of the object.

At block 814, the computing device (or component thereof) may render a segmentation image (e.g., segmentation mask 704 of FIG. 7) based on the deformed mesh model, the future location point, and the future camera pose. In some cases, the segmentation image comprises a segmentation mask for the object.

As noted herein, the techniques or processes described herein (e.g., the process 800) may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 800 and/or other processes described herein may include a processor, microprocessor, micro-computer, or other component of a device that is configured to carry out the steps of the process 800 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 800 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 800 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
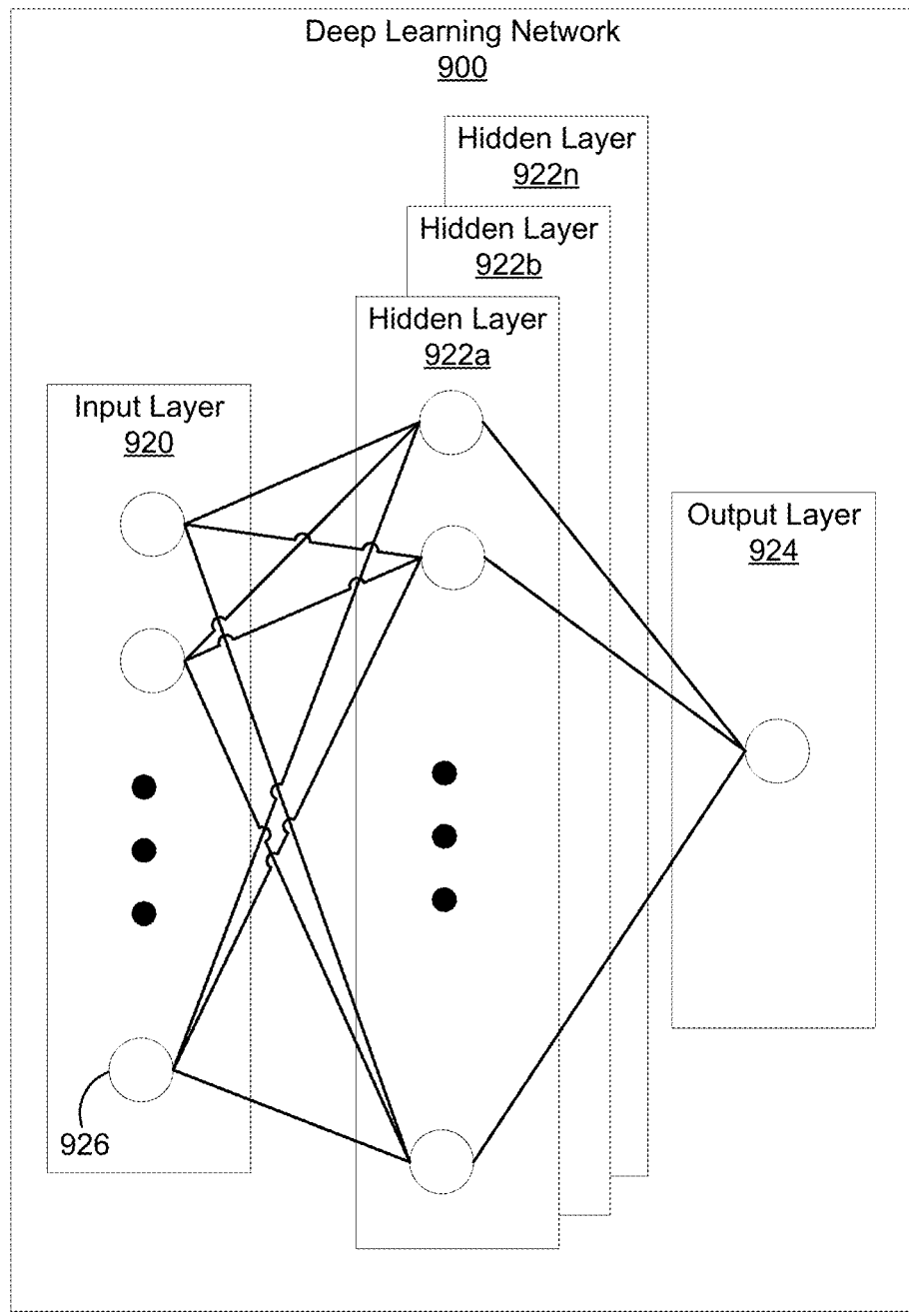
FIG. 9 is an illustrative example of a deep learning neural network that can be used by a 3D model training system.

FIG. 9 is an illustrative example of a deep learning neural network 900 that can be used by a 3D model training system. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to the information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, wi denotes the initial weight, and n denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
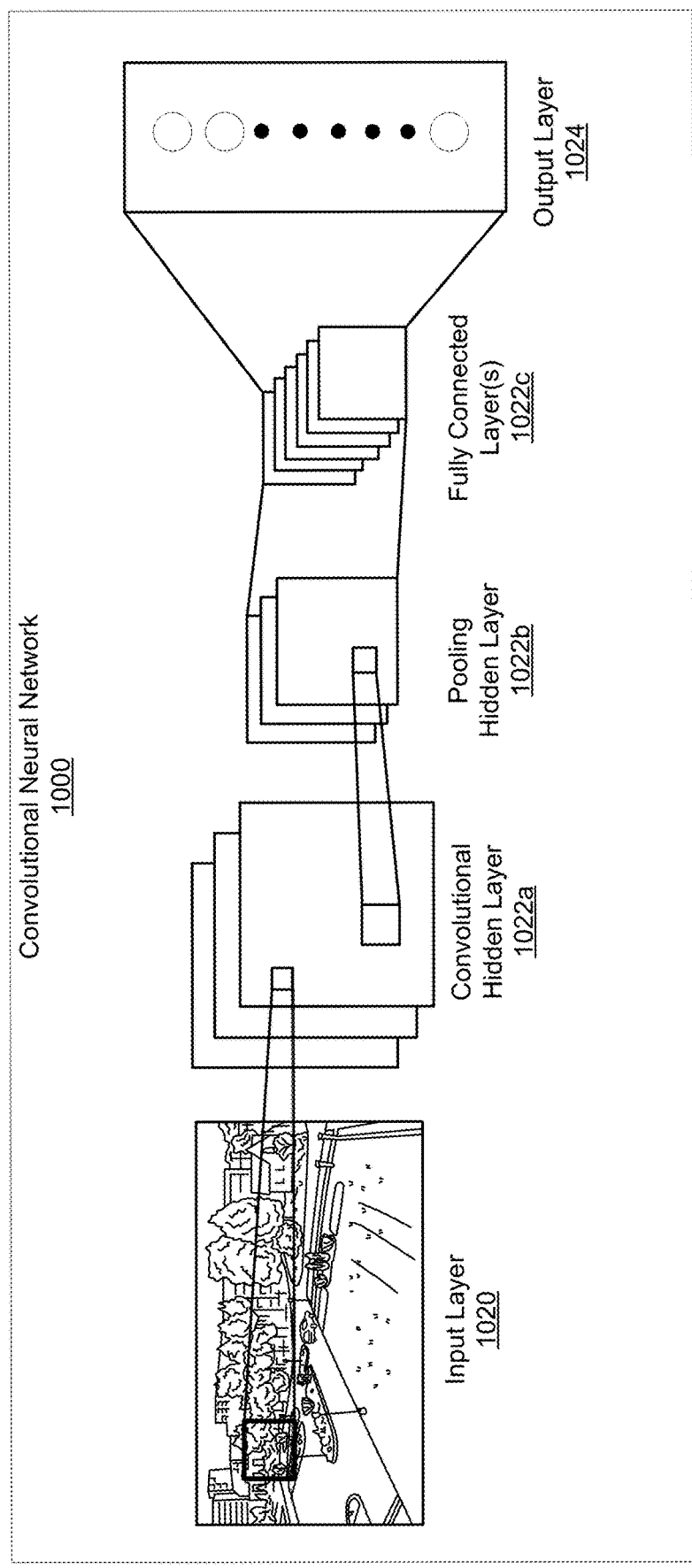
FIG. 10 is an illustrative example of a convolutional neural network (CNN).

FIG. 10 is an illustrative example of a convolutional neural network (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, camera, accelerometers, gyroscopes, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. A method for object segmentation, comprising: obtaining camera pose information for frames of a set of input frames; predicting a future camera pose based on the camera pose information; generating 3-dimensional (3D) keypoints for an object present in the set of input frames; predicting a future location point of the object based on location points associated with the 3D keypoints for the object; predicting a future pose of the object based on the 3D keypoints; deforming a mesh model of the object based on the future pose of the object; and rendering a segmentation image based on the deformed mesh model, the future location point, and the future camera pose.

Aspect 2. The method of Aspect 1, further comprising determining location points for the 3D keypoints.

Aspect 3. The method of Aspect 2, wherein the location points are based on an average location of a subset of 3D keypoints for the object, and wherein the location points describe an overall motion of the object in the set of input frames.

Aspect 4. The method of any of Aspects 2-3, wherein the future location point of the object is determined from the location points.

Aspect 5. The method of any of Aspects 1-5, wherein the future pose of the object is predicted independent of an overall motion of the object.

Aspect 6. The method of any of Aspects 1-5, wherein predicting the future pose of the object comprises: aligning 3D keypoints of the frames based on a determined location point of the 3D keypoints used for determining an overall motion of the object; removing the overall motion of the object from the 3D keypoints of the frames to generate pose motion 3D keypoints; and predicting the future pose based on the pose motion 3D keypoints.

Aspect 7. The method of any of Aspects 1-6, wherein the segmentation image comprises a segmentation mask for the object.

Aspect 8. An apparatus for object segmentation, the apparatus comprising: at least one memory; and at least one processor coupled to the at least one memory, the at least one processor being configured to: obtain camera pose information for frames of a set of input frames; predict a future camera pose based on the camera pose information; generate 3-dimensional (3D) keypoints for an object present in the set of input frames; predict a future location point of the object based on location points associated with the 3D keypoints for the object; predict a future pose of the object based on the 3D keypoints; deform a mesh model of the object based on the future pose of the object; and render a segmentation image based on the deformed mesh model, the future location point, and the future camera pose.

Aspect 9. The apparatus of Aspect 8, wherein the at least one processor is further configured to determine location points for the 3D keypoints.

Aspect 10. The apparatus of Aspect 9, wherein the location points are based on an average location of a subset of 3D keypoints for the object, and wherein the location points describe an overall motion of the object in the set of input frames.

Aspect 11. The apparatus of any of Aspects 9-10, wherein the future location point of the object is determined from the location points.

Aspect 12. The apparatus of any of Aspects 8-11, wherein the future pose of the object is predicted independent of an overall motion of the object.

Aspect 13. The apparatus of any of Aspects 8-12, wherein, to predict the future pose of the object, the at least one processor is further configured to: align 3D keypoints of the frames based on a determined location point of the 3D keypoints used for determining an overall motion of the object; remove the overall motion of the object from the 3D keypoints of the frames to generate pose motion 3D keypoints; and predict the future pose based on the pose motion 3D keypoints.

Aspect 14. The apparatus of any of Aspects 8-13, wherein the segmentation image comprises a segmentation mask for the object.

Aspect 15. A non-transitory computer-readable medium having stored thereon instructions that, when executed by at least one processor, cause the at least one processor to: obtain camera pose information for frames of a set of input frames; predict a future camera pose based on the camera pose information; generate 3-dimensional (3D) keypoints for an object present in the set of input frames; predict a future location point of the object based on location points associated with the 3D keypoints for the object; predict a future pose of the object based on the 3D keypoints; deform a mesh model of the object based on the future pose of the object; and render a segmentation image based on the deformed mesh model, the future location point, and the future camera pose.

Aspect 16. The non-transitory computer-readable medium of Aspect 15, wherein the instructions cause the at least one processor to determine location points for the 3D keypoints.

Aspect 17. The non-transitory computer-readable medium of Aspect 16, wherein the location points are based on an average location of a subset of 3D keypoints for the object, and wherein the location points describe an overall motion of the object in the set of input frames.

Aspect 18. The non-transitory computer-readable medium of any of Aspects 16-17, wherein the future location point of the object is determined from the location points.

Aspect 19. The non-transitory computer-readable medium of any of Aspects 15-18, wherein the future pose of the object is predicted independent of an overall motion of the object.

Aspect 20. The non-transitory computer-readable medium of any of Aspects 15-19, wherein, to predict the future pose of the object, the instructions cause the at least one processor to: align 3D keypoints of the frames based on a determined location point of the 3D keypoints used for determining an overall motion of the object; remove the overall motion of the object from the 3D keypoints of the frames to generate pose motion 3D keypoints; and predict the future pose based on the pose motion 3D keypoints.

Aspect 21: The non-transitory computer-readable medium of any of Aspects 15-20, wherein the segmentation image comprises a segmentation mask for the object.

Aspect 22: An apparatus for object segmentation, comprising means for performing one or more of operations according to any of Aspects 1 to 7.

What is claimed is:

1. A method for object segmentation, comprising:
   obtaining camera pose information for frames of a set of input frames;
   predicting a future camera pose based on the camera pose information;
   generating 3-dimensional (3D) keypoints for an object present in the set of input frames;
   predicting a future location point of the object based on location points associated with the 3D keypoints for the object;
   predicting a future pose of the object based on the 3D keypoints;
   deforming a mesh model of the object based on the future pose of the object; and
   rendering a segmentation image based on the deformed mesh model, the future location point, and the future camera pose.

2. The method of claim 1, further comprising determining location points for the 3D keypoints.

3. The method of claim 2, wherein the location points are based on an average location of a subset of 3D keypoints for the object, and wherein the location points describe an overall motion of the object in the set of input frames.

4. The method of claim 2, wherein the future location point of the object is determined from the location points.

5. The method of claim 1, wherein the future pose of the object is predicted independent of an overall motion of the object.

6. The method of claim 1, wherein predicting the future pose of the object comprises:
   aligning 3D keypoints of the frames based on a determined location point of the 3D keypoints used for determining an overall motion of the object;
   removing the overall motion of the object from the 3D keypoints of the frames to generate pose motion 3D keypoints; and
   predicting the future pose based on the pose motion 3D keypoints.

7. The method of claim 1, wherein the segmentation image comprises a segmentation mask for the object.

8. An apparatus for object segmentation, the apparatus comprising:
   at least one memory; and
   at least one processor coupled to the at least one memory, the at least one processor being configured to:
      obtain camera pose information for frames of a set of input frames;
      predict a future camera pose based on the camera pose information;
      generate 3-dimensional (3D) keypoints for an object present in the set of input frames;
      predict a future location point of the object based on location points associated with the 3D keypoints for the object;
      predict a future pose of the object based on the 3D keypoints;
      deform a mesh model of the object based on the future pose of the object; and
      render a segmentation image based on the deformed mesh model, the future location point, and the future camera pose.

9. The apparatus of claim 8, wherein the at least one processor is further configured to determine location points for the 3D keypoints.

10. The apparatus of claim 9, wherein the location points are based on an average location of a subset of 3D keypoints for the object, and wherein the location points describe an overall motion of the object in the set of input frames.

11. The apparatus of claim 9, wherein the future location point of the object is determined from the location points.

12. The apparatus of claim 8, wherein the future pose of the object is predicted independent of an overall motion of the object.

13. The apparatus of claim 8, wherein, to predict the future pose of the object, the at least one processor is further configured to:
- align 3D keypoints of the frames based on a determined location point of the 3D keypoints used for determining an overall motion of the object;
- remove the overall motion of the object from the 3D keypoints of the frames to generate pose motion 3D keypoints; and
- predict the future pose based on the pose motion 3D keypoints.

14. The apparatus of claim 8, wherein the segmentation image comprises a segmentation mask for the object.

15. A non-transitory computer-readable medium having stored thereon instructions that, when executed by at least one processor, cause the at least one processor to:
- obtain camera pose information for frames of a set of input frames;
- predict a future camera pose based on the camera pose information;
- generate 3-dimensional (3D) keypoints for an object present in the set of input frames;
- predict a future location point of the object based on location points associated with the 3D keypoints for the object;
- predict a future pose of the object based on the 3D keypoints;
- deform a mesh model of the object based on the future pose of the object; and
- render a segmentation image based on the deformed mesh model, the future location point, and the future camera pose.

16. The non-transitory computer-readable medium of claim 15, wherein the instructions cause the at least one processor to determine location points for the 3D keypoints.

17. The non-transitory computer-readable medium of claim 16, wherein the location points are based on an average location of a subset of 3D keypoints for the object, and wherein the location points describe an overall motion of the object in the set of input frames.

18. The non-transitory computer-readable medium of claim 16, wherein the future location point of the object is determined from the location points.

19. The non-transitory computer-readable medium of claim 15, wherein the future pose of the object is predicted independent of an overall motion of the object.

20. The non-transitory computer-readable medium of claim 15, wherein, to predict the future pose of the object, the instructions cause the at least one processor to:
- align 3D keypoints of the frames based on a determined location point of the 3D keypoints used for determining an overall motion of the object;
- remove the overall motion of the object from the 3D keypoints of the frames to generate pose motion 3D keypoints; and
- predict the future pose based on the pose motion 3D keypoints.

* * * * *